United States Patent [19]
Alger, Jr. et al.

[11] 3,808,659
[45] May 7, 1974

[54] BONDED BRONZE-IRON LINERS FOR STEEL CYLINDER BARREL AND METHOD OF MAKING SAME

[75] Inventors: Martin J. Alger, Jr.; Nelson H. Dunn, both of Watertown, N.Y.

[73] Assignee: General Signal Corporation, Rochester, N.Y.

[22] Filed: July 27, 1972

[21] Appl. No.: 275,731

Related U.S. Application Data
[62] Division of Ser. No. 93,298, Nov. 27, 1970, Pat. No. 3,709,108.

[52] U.S. Cl. ......... 29/156.4 WL, 29/182.1, 75/200, 75/208 R, 92/169
[51] Int. Cl. ............................ B23p 15/00, B22f 3/26
[58] Field of Search ............... 29/156.4 WL, 182.1, 149.5 PM; 75/208 R, 200; 92/169

[56] References Cited
UNITED STATES PATENTS
| | | | |
|---|---|---|---|
| 3,332,774 | 7/1967 | Tuttle | 29/149.5 PM |
| 3,326,678 | 6/1967 | Talmage | 29/182.1 |
| 3,125,441 | 3/1964 | Lafferty et al. | 29/182.1 |
| 2,778,742 | 1/1957 | Shipe | 29/182.1 |
| 2,759,846 | 8/1956 | Vosler | 29/182.1 |
| 2,753,859 | 7/1956 | Bartlett | 29/182.1 |
| 2,227,307 | 12/1940 | Hildabolt | 75/208 R |
| 3,414,391 | 12/1968 | Brab | 29/182.1 |

FOREIGN PATENTS OR APPLICATIONS
| | | | |
|---|---|---|---|
| 308,819 | 2/1930 | Great Britain | 29/182.1 |

Primary Examiner—Charles W. Lanham
Assistant Examiner—D. C. Crane
Attorney, Agent, or Firm—Harold S. Wynn

[57] ABSTRACT

The disclosure concerns cylinder barrels for piston pumps and motors which have lined cylinder bores. Each liner comprises a matrix of sintered, powdered iron which is impregnated with bronze, and which is metallurgically and mechanically bonded to the steel barrel. The liners are formed from porous, sintered iron sleeves which are placed in the bores in contact with bronze slugs. The assembly is heated in a non-oxidizing atmosphere to a temperature between 1,900°F and 2,000°F to melt the bronze and cause it to infiltrate the sintered preform and bond to the steel. Thereafter, the assembly is cooled in the non-oxidizing atmosphere to solidify the bronze, followed by air cooling to room temperature. Finally, the finished cylinder bores are machined in the bonded bronze-iron sleeves.

9 Claims, 7 Drawing Figures

PATENTED MAY 7 1974

3,808,659

BONDED BRONZE-IRON LINERS FOR STEEL CYLINDER BARREL AND METHOD OF MAKING SAME

CROSS-REFERENCE TO RELATED APPLICATION

This application is a division of application Ser. No. 93,298, filed Nov. 27, 1970, now U.S. Pat. No. 3,709,108.

BACKGROUND AND SUMMARY OF THE INVENTION

In hydraulic pumps and motors of the rotary cylinder barrel, longitudinally reciprocating piston type, the pistons are moved on their discharge strokes by an inclined cam plate. The force transmitted between the cam plate and each piston acts at an angle to the longitudinal axis of the piston, with the result that the radial component of this force produces a bending moment on the piston. In high speed, high pressure units, wherein the pistons and the cylinder barrel are made of steel, this condition frequently causes piston galling and seizure. It has been proposed to solve this problem by using bronze cylinder bore liners; however, since, in the usual case, the inner end of the liner is subjected to the pressure within the cylinder bore, the interfaces between the liners and the walls of the encircling bores provide potential leakage paths along which fluid may escape. Although considerable effort has been directed toward developing practical production techniques for producing a reliable fluid-tight bond between the bronze liner and the steel bore wall, as far as we are aware, none of these prior attempts have been entirely satisfactory.

In one prior design, see U.S. Pat. 3,169,488, granted Feb. 16, 1965, the need for a fluid-tight bond between the liner and the bore wall is eliminated by extending the liner completely through the cylinder barrel. This scheme, however, inherently reduces the amount of steel around the bores at the high pressure end of the cylinder barrel, and cannot be used in today's high performance units which operate continuously at pressures of 5,000 p.s.i. and at rotary speeds around 4,000 r.p.m. Furthermore, since the liners in the patented design are machined from solid bronze rods, that approach wastes considerable amounts of this expensive bearing material.

The object of this invention is to provide a practical production process for producing lined cylinder bores which affords a leakage-free interface between the liners and the steel bore walls, and which also provides a liner having superior properties. According to the invention, the new liner comprises a sintered, powdered iron matrix which is completely impregnated with bronze and which is metallurgically and mechanically bonded to the surrounding steel wall. This type of liner affords an excellent bearing surface having greater srength than the bronze and better bearing characteristics than the iron. And, the intimate bond with the steel wall not only anchors the liner in place, but affords an absolute seal against leakage along the interface. Thus, in high performance pumps and motors, the liner can terminate in the bore, thereby leaving the strength of the high pressure end of the cylinder barrel unimpaired.

The process for producing the new liners commences with the formation of an assembly including a steel cylinder barrel blank containing the cylinder bores which are to be lined, a set of porous, sintered iron sleeves, one being positioned within each bore, and a set of bronze slugs which are placed in the bores in contact with the sleeves. The assembly is then heated in a non-oxidizing atmosphere to a temperature between 1,900°F and 2,000°F to melt the slugs and cause the bronze to infiltrate the sintered iron sleeves and bond to the steel walls of the encircling bores. Thereafter, the assembly is cooled in the controlled atmosphere to solidify the bronze, and then it is air cooled to room temperature. Finally, the finished cylinder bores are machined in the bronze-impregnated iron matrices. This procedure produces the improved liners in a reasonable length of time and involves removal by machining of only a relatively small amount of the expensive bronze material. Therefore, it is a practical production technique.

BRIEF DESCRIPTION OF THE DRAWING

The preferred embodiment of the invention and several alternatives are described herein with reference to the accompanying drawing in which.

DETAILED DESCRIPTION OF THE EMBODIMENT OF FIGS. 1–5

Figure 1:
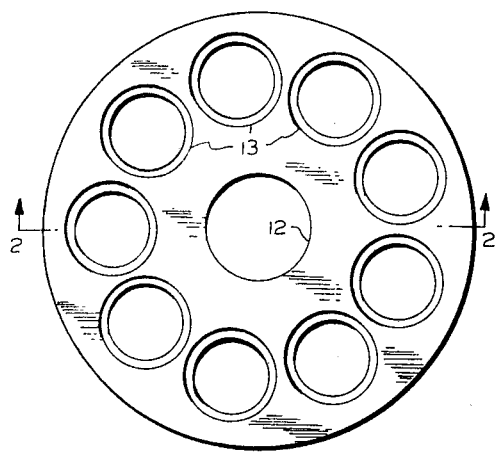
FIG. 1 is a top plan view of the cylinder barrel blank.
Figure 2:
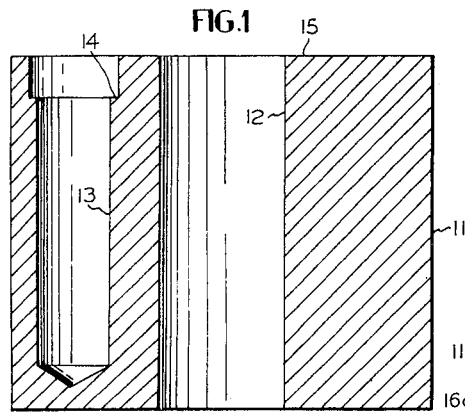
FIG. 2 is a sectional view taken on line 2—2 of FIG. 1.

The initial step of the preferred process consists in fabricating the cylinder barrel blank 11 shown in FIGS. 1 and 2. The blank is made of SAE 52100, 1045 or 4150 steel and is drilled to provide a through axial bore 12 and a circular series of parallel, stepped bores 13. The annular shoulder 14 formed at the junction of the large and small diameter portions of bore 13 is located sufficiently close to the end face 15 of blank 11 that it will be removed during the final machining of the cylinder barrel. The bores 13 are left in the rough drilled state since surface irregularities aid, rather than hinder, the bonding process. Moreover, it has been found that the process is not adversely affected by the formation of rust on the walls of bores 13. After rough machining, blank 11 is cleaned to remove chips and then vapor degreased. Degreasing is not essential because any adherent oil and grease films will be burned off before the bronze-steel bond is effected. However, since these volatiles may leave a residue on the bore walls which could cause localized impairment of the bond, it is considered best to remove them initially.

Following these initial steps, each bore 13 is equipped with a sintered iron sleeve 16 (see FIG. 3) which hangs from an integral flange 17 which rests on bore shoulder 14. Sleeves 16 are made from the fine iron powder normally used in the powdered metal industry and have a density between 4.5 and 6.0 gms/cc. In other words, these parts are porous, and, based on a pure iron density of 7.9 gms/cc, each includes 24 percent to 43 percent voids. These voids are distributed uniformly throughout the mass of each sleeve and define capillary passages which permit complete infiltration by molten bronze. Except for their low density, sleeves 16 are formed and sintered in the same manner as a conventional powdered iron part.

Sleeves 16 fit bores 13 with a controlled clearance selected to take into account the fact that they grow when they are infiltrated with bronze. If the clearance is too small and the density of the sintered iron is at the low end of the specified range, the iron particles sometimes dissociate and permit the sleeve to warp buckle away from the wall of bore 13. When the gaps thus created become too large, they will not be filled with bronze, and the bond will be unreliable. A similar, though more extensive, defect will occur if the clearance is made too great. Experience indicates that the proper approach is to correlate density and clearance so that the sleeve will grow into intimate contact with the bore wall during infiltration, but will not develop contact pressures sufficient to break the bonds between the iron particles. This is basically an empirical operation. However, as a guide, it should be noted that our work shows that bores having diameters on the order of 1 inch can be lined satisfactorily on a production basis using a sleeve 16 having a density of 5.6–5.8 gms/cc, i.e., containing 29– 27 percent voids) and a wall thickness of about 0.16 inches, and providing a diametral clearance of 0.002–0.006 inches.

In addition to the sleeve 16, each bore 13 also is provided with a cylindrical slug 18 of bronze. The slug rests upon the web 19 at the upper end of the sleeve 16 and contains an amount of metal sufficient to completely fill the pores in the sleeve. Slug 18 can be made of various bronzes, but experience shows that the composition should be free of zinc and nickel because these metals tend to separate from the other constituents and form a brittle interface which may crack under the service conditions encountered by the cylinder barrel. The composition should also have as low a lead content as possible because this metal will "bleed out" during heat treatment of the driving splines of the finished cylinder barrel. Bronzes having the following compositions, by weight, have proven acceptable:

a. 80 percent copper, 10 percent tin, 10 percent lead
b. 89 percent copper, 11 percent tin
c. 90 percent copper, 10 percent tin However, the preferred slug 18 is made of a bronze containing 85 percent copper, 10 percent tin and 5 percent lead and which is purchased commercially in the nickel-free form. Although the slugs may be solid bronze castings, it is considered better to use sintered masses of bronze powder because this permits better control of composition.

Figure 3:
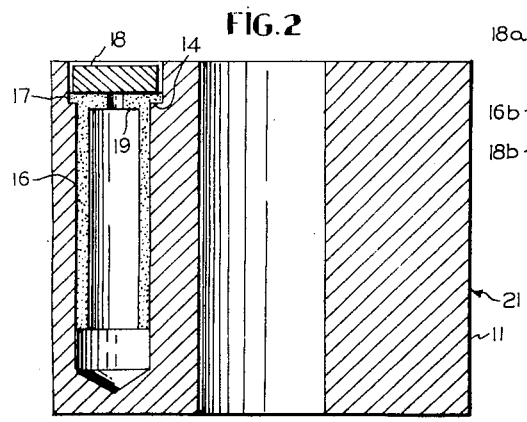
FIG. 3 is a sectional view similar to FIG. 2, showing the preferred blank-sleeve-slug assembly.

After the blank-sleeve-slug assembly 21 of FIG. 3 has been completed, it is placed in a furnace and supported in the illustrated upright position. The furnace should contain a non-oxidizing atmosphere, such as the filtered natural gas product commonly employed to control decarburization of the steel in blank 11 during heat treatment, and, in a typical case, it would be at a temperature of about 1600°F at the time assembly 18 is introduced. Furnace temperature is then raised to an elevated level above the melting range of the bronze and held there long enough to insure that all parts of assembly 21 reach a temperature which will produce a good metallurgical bond between the bronze and the steel. Although bonding can be effected at an assembly temperature on the order of 1900°F, experience indicates that a temperature of 1,950°F is needed in order to provide the degree of bonding reliability required for a production process. The furnace temperature and length of time this temperature must be maintained in order to achieve the required assembly temperature must be determined empirically because these factors vary with furnace design and loading, i.e., the number of assemblies 21 being processed at the same time. The final selection involves a compromise since higher temperatures shorten holding time but also cause excessive evaporation of bronze and, because of localized hot spots, involve some risk of melting portions of steel blank 11. Our studies show that furnace temperatures above 2,000°F are too risky and are not really demanded by practical production considerations. For example, using a standard heat-treating furnace capable of simultaneously processing thirty assemblies, we found that acceptable bonds were produced reliably at a furnace temperature of 1,990°F which was maintained for 1 hour.

During the heating cycle just mentioned, the slugs 18 melt, and the molten bronze is drawn into and through each sleeve 16 by capillary action. As the sleeves are infiltrated by the bronze, they grow or expand and thereby establish intimate contact with the walls of the bores 13. As a result, the bronze which wets the outside surface of each sleeve can migrate into, and bond with, the steel of blank 11. This bond has both a mechanical and a metallurgical nature and extends over the entire interface between each sleeve 16 and the wall of the associated bore 13. Moreover, since the growth of the sleeve experienced during infiltration is permanent, the bond which has been formed is not broken or impaired by shrinkage during the cooling cycle which follows.

Figure 4:
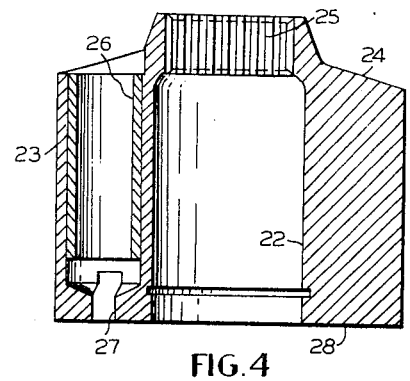
FIG. 4 is an axial sectional view of the finished cylinder barrel.
Figure 5:
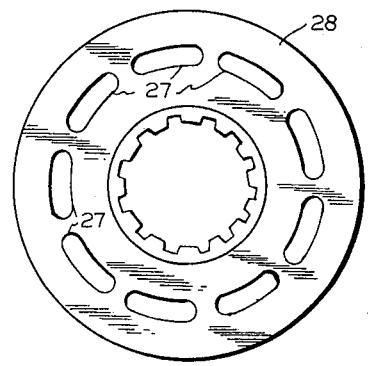
FIG. 5 is a plan view showing the valving face of the cylinder barrel of FIG. 4.

At the end of the heating cycle, i.e., after all parts of assembly 21 have reached the selected bonding temperature, the furnace is allowed to cool so that the temperature of assembly 21 reduces below the melting range of the bronze. Typically, this phase of the process consumes 1 hour, furnace temperature decreases to about 1,400°F, and the temperature of assembly 18 drops to a level below 1,500°F. These conditions insure solidification of the bronze and permit opening of the furnace without risk of explosion of the controlled atmosphere. Therefore, assembly 21 is now removed from the furnace, allowed to air cool to room temperature, and then transformed into the completed cylinder barrel shown in FIGS. 4 and 5 by the final finishing operations. These include:

1. Machining the inner and outer peripheral surfaces 22 and 23, respectively, and the front face 24.
2. Cutting and heat treating driving splines 25.
3. Boring and honing cylinder bores 26.
4. End milling an arcuate port 27 for each cylinder bore.
5. Grinding and lapping valving face 28.

Although the foregoing description treats only the process steps of the present invention, it should be understood that, in the complete commercial process, bonding of the cylinder bore liners is effected simultaneously with the valve plate bonding step of our application Ser. No. 93,129, or Ser. No. 93,297, which have resulted in U.S. Pats. 3,707,034 and 3,709,107 respectively.

DESCRIPTION OF THE EMBODIMENTS OF FIGS 6 AND 7

Figures 6, 7:
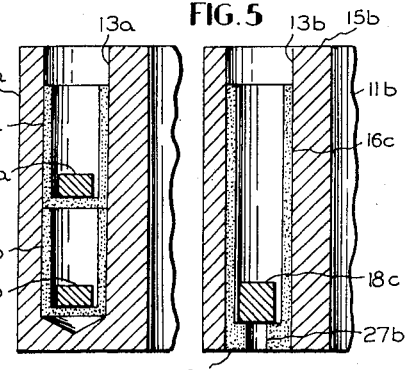
FIG. 6 and 7 are fragmentary sectional views similar to FIG. 3, showing alternative blank-sleeve-slug assemblies.

Since, as mentioned earlier, the sintered iron sleeves 16 are infiltrated with bronze by capillary action, is should be evident that the elevation of the bronze slug 18 with respect to the sleeve is immaterial. This point is emphasized by the FIG. 6 embodiment, wherein infiltration is effected from below, rather than above. This embodiment also highlights the fact that the sintered iron sleeve can comprise separate sections, such as the abutting sections 16a and 16b, and that the bronze charge can be made up of a group of discrete, smaller charges 18a and 18b.

Although the arcuate ports 27 of cylinder barrels used in the high performance pumps and motors referred to above must be surrounded by steel, this is not true for those units which operate in a pressure range of 1500 to 2000 p.s.i. and at speeds below 3000 r.p.m. Therefore, the cylinder barrels for these units may be made from the assembly shown in FIG. 7. In this embodiment, the bores 13b are of uniform diameter and extend through blank 11b, and the sintered iron sleeve 16c is formed with a thickened end web 19b which, after impregnation and bonding, will serve as the end wall of the finished cylinder bore. This arrangement is particularly desirable first, because it reduces considerably the length of the liner-steel interface which is subject to high pressure, as in U.S. Pat. No. 3,169,488, and second, because it allows the arcuate ports 27b to be molded in the iron preform, thereby obviating end milling operations.

We claim:

1. A process for making lined cylinder bores in a cylinder barrel for a piston pump or motor comprising the steps of
   a. fabricating a steel barrel blank having an end face and containing a circular series of bores which open through said face;
   b. fabricating porous, sintered, powdered iron sleeves for lining the bores of diameters to fit loosely within the bores to permit growth of the sleeves when impregnated and having flanges at one end, there being a diametral clearance of 0.002 to 0.006 inches between each sleeve and the wall of the associated bore;
   c. positioning one of the sleeves within each bore only to an extent limited by its flange;
   d. disposing a slug of bronze on each of the flanges;
   e. heating the blank-sleeve-slug assembly in a non-oxidizing atmosphere to a temperature between 1,900°F and 2,000°F to melt said slugs and cause the bronze to infiltrate the sleeves and to bond to the steel walls of the bores;
   f. cooling said assembly in the presence of the non-oxidizing atmosphere to solidify the bronze;
   g. further cooling the assembly to room temperature; and
   h. finish machining after cooling a piston-receiving cylinder bore in each bronze-impregnated sleeve.

2. The process defined in claim 1 in which the density of the sintered iron sleeves is between 4.5 and 6.0 gms/cc.

3. The process defined in claim 2 in which the density of the sintered iron sleeves is 5.6 to 5.8 gms/cc.

4. The process defined in claim 1 in which the assembly is heated to a temperature of 1,950°F.

5. The process defined in claim 1 in which
   a. the assembly is cooled in the non-oxidizing atmosphere to a temperature between 1400°F and 1,500°F; and
   b. said further cooling is effected in air.

6. The process defined in claim 1 in which
   a. the blank is made of SAE 52100, 1045 or 4150 steel;
   b. the slugs are made of sintered, nickel-free bronze powder containing, by weight, 85 percent copper, 10 percent tin and 5 percent lead;
   c. the sintered iron sleeves have a density between 5.5 and 5.8 gms/cc;
   d. the assembly is heated to a temperature of 1,950°F and is cooled in said non-oxidizing atmosphere to a temperature between 1,400°F and 1,500°F; and
   e. said further cooling is effected in air.

7. The process defined in claim 1 in which
   a. each bore is provided with an enlarged portion at the end adjacent said face which defines a step;
   b. each sleeve is formed with a flange at one end which engages the step and supports the sleeve in the bore;
   c. each bronze slug is set into said enlarged bore portion and rests on a transverse web at the end of the sleeve; and
   d. the end face of the blank is finish machined after said cooling steps to remove the enlarged portions of the bores and the impregnated flanges and webs of the sleeves.

8. The process defined in claim 1 in which
   a. said bores extend completely through the blank; and
   b. each sleeve includes a transverse web at the end thereof remote from said end face and is shorter than the entire length of the bore.

9. The process defined in claim 8 in which each of said transverse webs is pierced by a port.

* * * * *